US012567080B2

(12) United States Patent
Katiyar et al.

(10) Patent No.: US 12,567,080 B2
(45) Date of Patent: Mar. 3, 2026

(54) IMPROVING ACCURACY AND EFFICIENCY OF PREDICTION PROCESSES ON BIG DATA SETS USING DOMAIN BASED SEGMENTATION AND TIME SERIES CLUSTERING

(71) Applicant: Genpact USA, Inc., New York, NY (US)

(72) Inventors: Rajat Katiyar, Lucknow (IN); Naman Mishra, Indore (IN); Mohit Makkar, Gurgaon (IN); Omprakash Ranakoti, Bangalore (IN); Sreekanth Menon, Bangalore (IN)

(73) Assignee: Genpact USA, Inc., New York, NY (US)

( * ) Notice: Subject to any disclaimer, the term of this patent is extended or adjusted under 35 U.S.C. 154(b) by 100 days.

(21) Appl. No.: 17/708,392

(22) Filed: Mar. 30, 2022

(65) Prior Publication Data

US 2023/0316302 A1     Oct. 5, 2023

(51) Int. Cl.
G06Q 30/0202      (2023.01)
G06F 16/28         (2019.01)
G06F 17/18         (2006.01)
G06Q 30/0201      (2023.01)

(52) U.S. Cl.
CPC ....... G06Q 30/0202 (2013.01); G06F 16/287 (2019.01); G06F 17/18 (2013.01); G06Q 30/0201 (2013.01)

(58) Field of Classification Search
None
See application file for complete search history.

(56) References Cited

U.S. PATENT DOCUMENTS

| 11,080,127 B1 * | 8/2021 | Vincent | ................. | G06N 5/048 |
| 2005/0096964 A1 * | 5/2005 | Tsai | ....................... | G06Q 10/04 |
| | | | | 705/7.31 |
| 2005/0234718 A1 * | 10/2005 | Ouimet | ............. | G06Q 30/0202 |
| | | | | 704/241 |

(Continued)

OTHER PUBLICATIONS

Jha, Bineet Kumar, and Shilpa Pande. "Time series forecasting model for supermarket sales using FB-prophet." 2021 5th International Conference on Computing Methodologies and Communication (ICCMC). IEEE, 2021 (Year: 2021).*

(Continued)

*Primary Examiner* — Darlene Garcia-Guerra
(74) *Attorney, Agent, or Firm* — Goodwin Procter LLP

(57)              ABSTRACT

A method and system for time series forecasting on a big data set are provided. The method includes receiving a plurality of time series, each of the time series representing a historical demand pattern for an item, performing a domain-based segmentation to identify a plurality of statistically forecastable time series from the plurality of time series, grouping the plurality of statistically forecastable time series into one or more clusters, for each cluster, generating an aggregate time series based on time series included in the cluster, performing a future demand forecast at a cluster level by performing time series forecasting of the aggregate time series for each cluster, and determining a future demand forecast for each item based on the time series forecasting of the aggregate time series.

17 Claims, 11 Drawing Sheets

(56)                  References Cited

U.S. PATENT DOCUMENTS

| | | | | |
|---|---|---|---|---|
| 2005/0256759 A1* | 11/2005 | Acharya | ............... | G06Q 30/02 |
| | | | | 705/7.31 |
| 2008/0147486 A1* | 6/2008 | Wu | ........................ | G06Q 30/02 |
| | | | | 705/7.29 |
| 2009/0055270 A1* | 2/2009 | Magdon-Ismail | .... | G06F 16/957 |
| | | | | 705/14.27 |
| 2012/0310939 A1* | 12/2012 | Lee | ....................... | G06F 16/907 |
| | | | | 707/E17.046 |
| 2017/0228751 A1* | 8/2017 | Anderson Arguelles | ................... | |
| | | | | G06Q 30/0201 |
| 2018/0336766 A1* | 11/2018 | Cantley | ............... | G06Q 10/087 |
| 2019/0139059 A1* | 5/2019 | Shiga | ..................... | G06N 20/00 |
| 2019/0205833 A1* | 7/2019 | Biro | ................... | G06Q 10/0875 |
| 2021/0125001 A1* | 4/2021 | Guo | ........................ | G06F 16/55 |
| 2021/0334830 A1* | 10/2021 | Lei | ........................ | G06Q 10/04 |
| 2022/0180274 A1* | 6/2022 | Makhija | ................. | G06N 3/045 |
| 2022/0327058 A1* | 10/2022 | Vu | ..................... | G06F 12/0871 |

OTHER PUBLICATIONS

Abolghasemi, Mahdi, et al. "Demand forecasting in supply chain: The impact of demand volatility in the presence of promotion." Computers & Industrial Engineering 142 (2020): 106380 (Year: 2020).*

Zhou, Lina, et al. "Machine learning on big data: Opportunities and challenges." Neurocomputing 237 (2017): 350-361 (Year: 2017).*

Boppiniti, Sai Teja. "Big data meets machine learning: Strategies for efficient data processing and analysis in large datasets." International Journal of Creative Research In Computer Technology and Design 2.2 (2020) (Year: 2020).*

Seyedan, Mahya, and Fereshteh Mafakheri. "Predictive big data analytics for supply chain demand forecasting: methods, applications, and research opportunities." Journal of Big Data 7.1 (2020): 53 (Year: 2020).*

Galicia, Antonio, et al. "Multi-step forecasting for big data time series based on ensemble learning." Knowledge-Based Systems 163 (2019): 830-841 (Year: 2019).*

Lundh, et al., "Forecasting Initial Phase Spare Part Demand Using Installed Based Data," Chalmers University of Technology, Gothenburg, Sweden 2020, 72 pages.

Vargas, et al., "Automobile Spare-Parts Forecasting: A Comparative Study of Time Series Methods," Int'l Journal of Automotive and Mechanical Engineering, vol. 14, Issue 1, pp. 3898-3912, Mar. 2017.

Wang, et al., "Method of Spare Parts Prediction Models Evaluation Based on Grey Comprehensive Correlation Degree and Association Rules Mining: A Case Study in Aviation," Hindawi, Mathematical Problems in Engineering, vol. 2018, Article ID 2643405, 10 pages, 2018.

* cited by examiner

Figure 3:
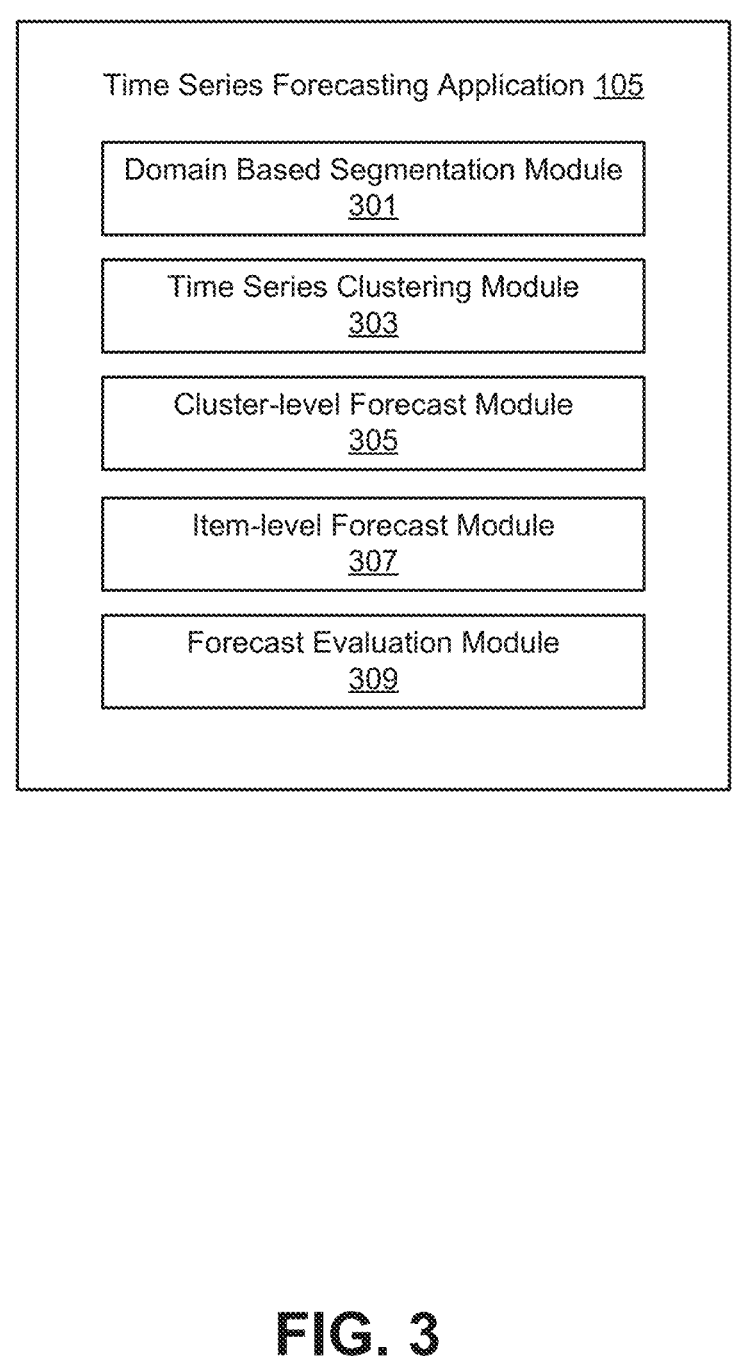

Time Series Forecasting Application 105

Domain Based Segmentation Module
301

Time Series Clustering Module
303

Cluster-level Forecast Module
305

Item-level Forecast Module
307

Forecast Evaluation Module
309

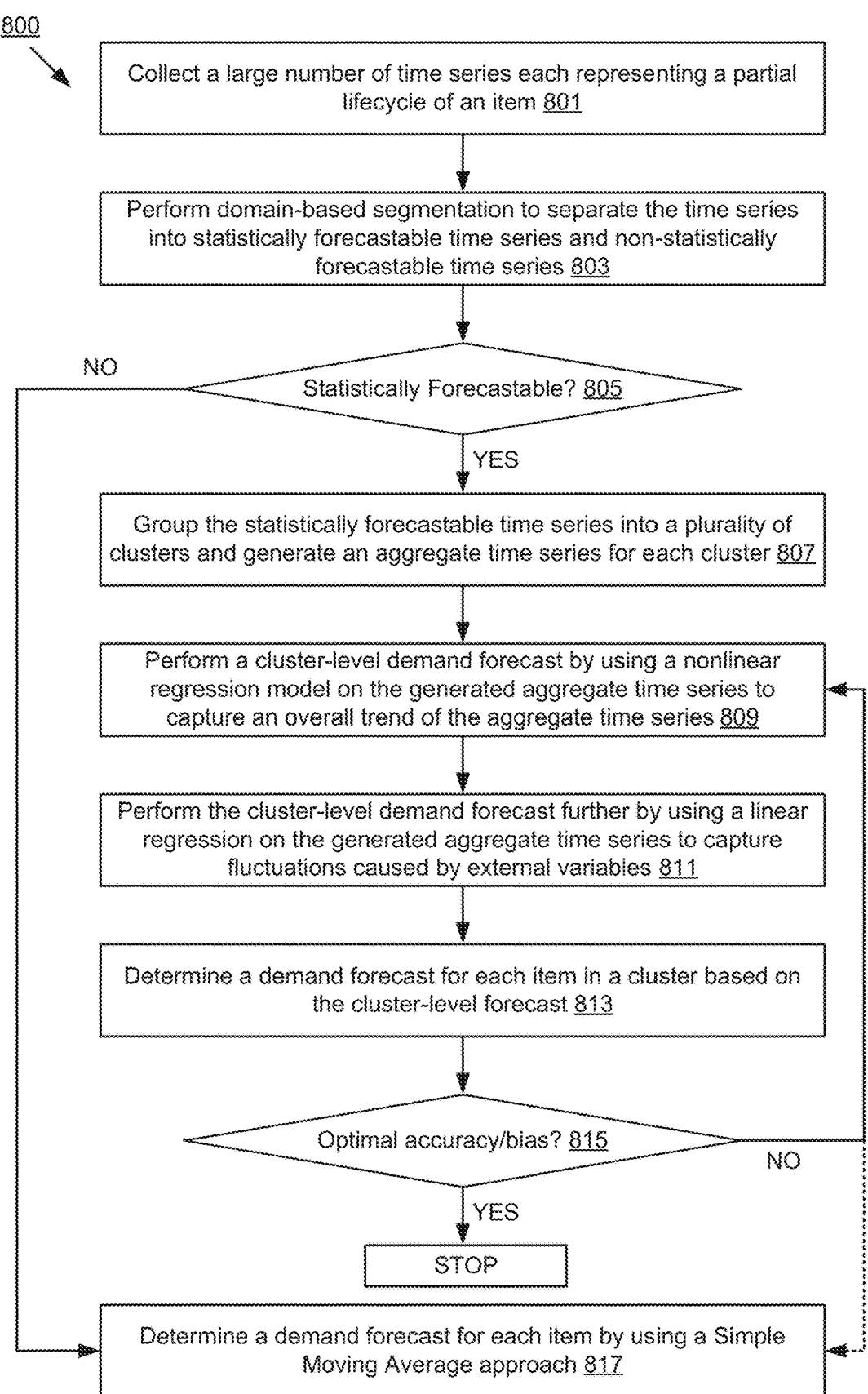

Collect a large number of time series each representing a partial lifecycle of an item 801

Perform domain-based segmentation to separate the time series into statistically forecastable time series and non-statistically forecastable time series 803

Statistically Forecastable? 805

NO

YES

Group the statistically forecastable time series into a plurality of clusters and generate an aggregate time series for each cluster 807

Perform a cluster-level demand forecast by using a nonlinear regression model on the generated aggregate time series to capture an overall trend of the aggregate time series 809

Perform the cluster-level demand forecast further by using a linear regression on the generated aggregate time series to capture fluctuations caused by external variables 811

Determine a demand forecast for each item in a cluster based on the cluster-level forecast 813

Optimal accuracy/bias? 815

NO

YES

STOP

Determine a demand forecast for each item by using a Simple Moving Average approach 817

FIG. 8

IMPROVING ACCURACY AND EFFICIENCY OF PREDICTION PROCESSES ON BIG DATA SETS USING DOMAIN BASED SEGMENTATION AND TIME SERIES CLUSTERING

TECHNICAL FIELD

This disclosure relates to a method and system for improving accuracy and efficiency of forecasting on a big data set under a network-based computing environment.

BACKGROUND

Time series forecasting is a data analysis method that aims to reveal certain patterns from the dataset in an attempt to predict future values. Some examples of time series data include stock exchange rates, electricity load statistics, monthly (or daily, hourly) customer demand data, micro and macroeconomic parameters, genetic patterns, and many others. Time series forecasting generally uses a model to predict future values based on previously observed values. For processing a small amount of data, such as demand forecast for a single or a few items, currently available models such as autoregressive integrated moving average (ARIMA), Croston, single exponential smoothing, double exponential smoothing, and triple exponential smoothing are generally useful. However, when forecasting demand at a larger level, e.g., at an organization level with thousands or even millions of items, time series forecasting may be computationally expensive and time-consuming. For example, if modeling each item takes just one minute (which is a conservative estimate) using currently available models, forecasting 1 million items may take up to 1 million minutes, or 700 days, which is infeasible for many organizations. Forecasting demand at a product category or a class of product may bring down the computation expense, but this approach generally leads to information loss at the item level, thereby leading to inaccurate forecasts for specific items. Therefore, a model for accurate and efficient time series forecasting for a big data set, e.g., a large number of items, is needed.

SUMMARY

To address the aforementioned shortcomings, a method and a system for time series forecasting for a big data set are provided. The method includes receiving a plurality of time series, each of the time series representing a historical demand pattern for an item. The method further includes performing a domain-based segmentation to identify a plurality of statistically forecastable time series from the plurality of time series. The method additionally includes grouping the plurality of statistically forecastable time series into one or more clusters. The method additionally includes generating an aggregate time series for each cluster based on the time series included in the cluster. The method additionally includes performing a future demand forecast at a cluster level by performing time series forecasting of the aggregate time series for each cluster. The method additionally includes determining a future demand forecast for each item based on the time series forecasting of the aggregate time series.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 3 is a block diagram of example modules included in a time series forecasting application, according to embodiments of the disclosure.

FIG. 8 is a flow chart of an example method for time series forecasting on a big data set, according to embodiments of the disclosure.

DETAILED DESCRIPTION

Figure 1:
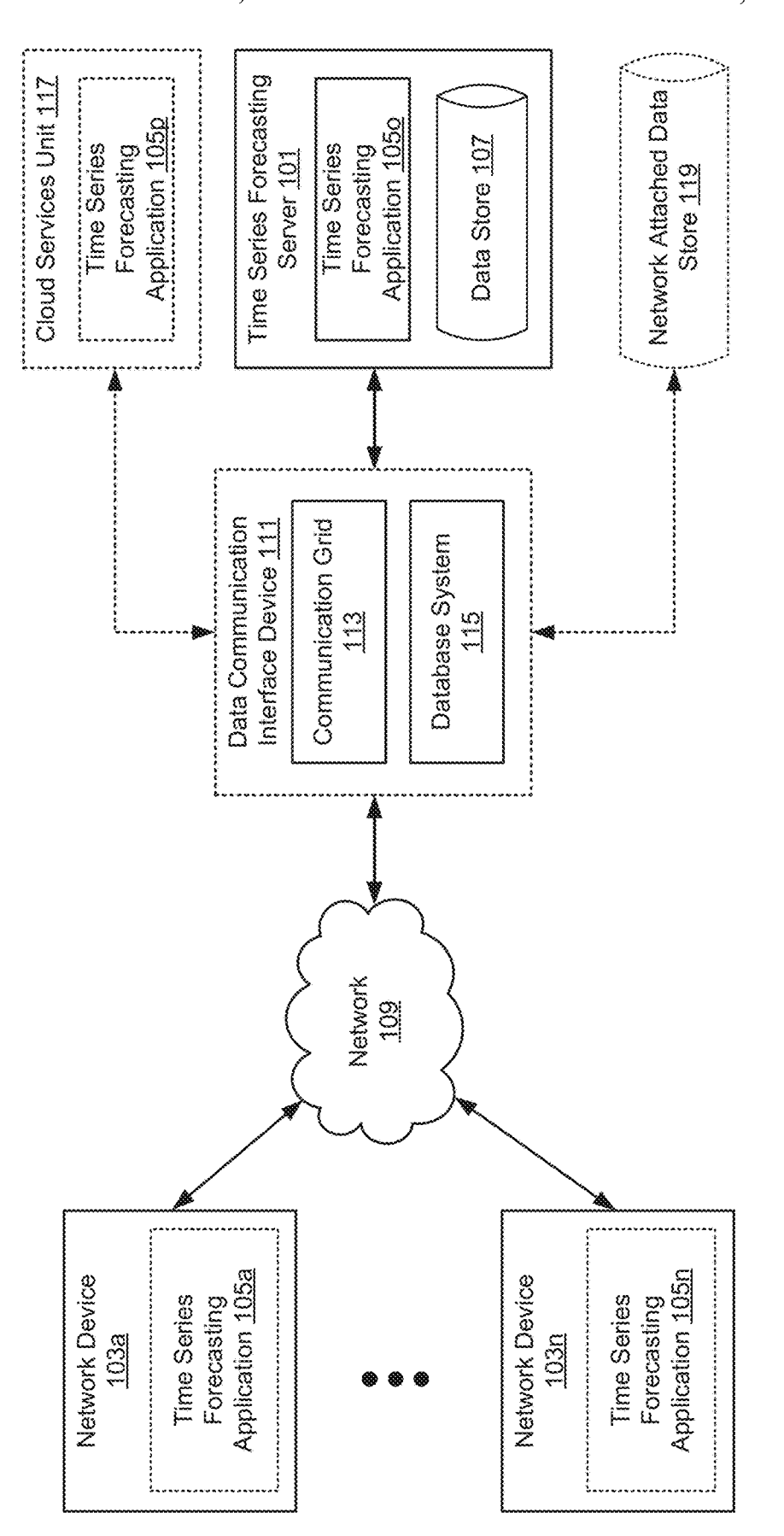
FIG. 1 is a block diagram of an example big data time series forecasting system, according to embodiments of the disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure provides technical solutions to address the technical problems of low efficiency and inaccuracy of time series forecasting for a big data set (e.g., thousands or even millions of items at an organization level) on a big data time series forecasting system. The technical solutions disclosed herein may include a domain-based segmentation model configured to separate a large number of time series into different segments, which are then subject to different modeling processes in time series forecasting. For example, in demand forecasting, time series data exhibiting scarce demand for certain items may be first categorized as non-statistically forecastable and be treated differently from most other statistically forecastable items, as time series data for these non-statistically forecastable items may easily lead to inaccurate forecasting when applying machine learning-based algorithms designed for forecasting other statistically forecastable items, as will be described later.

The technical solutions disclosed herein may further include a time series clustering model configured to cluster statistically forecastable items according to demand patterns of these items. For example, items with similar demand patterns may be clustered together as a cluster. Time series forecasting may be then performed at the cluster level instead of at an item-specific level. Since each cluster may include a large number of items, forecasting demand at the cluster level instead of item level may greatly reduce the total time of time series forecasting for a large number of items at the organization level, thereby reducing runtime and/or computer resources assigned for forecasting demands for a large number of items in a computing environment.

In some embodiments, the technical solutions disclosed herein may additionally include a time series forecasting model configured to regress time series data over time in forecasting demand for statistically forecastable items. The time series forecasting model may employ a two-step regression strategy, a first-step nonlinear regression configured to regress time series data over time to identify the overall trend of the demand pattern, and a second-step linear regression configured to learn any mutation a demand pattern might incur by taking additional external variables into the model. By separating the regression into two different steps, it may be ensured that certain unusual demand patterns are not lost during the regression, thereby improving accuracy in the time series forecasting.

In some embodiments, the technical solutions disclosed herein may additionally include a bias-correction/variance-correction process configured to preprocess certain variance and bias associated with time series data before clustering, to allow the clustering to be not influenced by noise, which then makes the overall process robust in demand forecasting. In addition, in some embodiments, items showing high error may be forecasted individually, so as to ensure prediction accuracy for these items.

The technical solutions disclosed herein show advantages over other existing time series forecasting models or approaches. For example, the technical solutions disclosed herein are computationally efficient since demand forecast at the cluster level significantly brings down computational expense incurred when compared to forecasting each specific item. In addition, the technical solutions disclosed herein may easily handle the demand fluctuations caused by various external forces, e.g., weather conditions affecting the retail consumer packaged goods (CPG) sector, holiday season affecting automobile sales, etc. Moreover, technical solutions disclosed herein may allow items with a higher error to be forecasted individually, and allow variance and bias to be preprocessed to allow the clustering to be not influenced by noise, all of which makes the overall forecasting process robust and accurate. The technical solutions disclosed herein, therefore, show improvements in time series forecasting under a computing environment, particularly in big data time series forecasting that conventionally requires a large number of computing resources to forecast demands for a large number of items.

The technical solutions disclosed herein are for illustrative purposes only and may include additional processes or functions, as will be described in more detail below.

FIG. 1 is a block diagram of hardware components for a big data time series forecasting system 100, according to embodiments of the disclosure. Big data time series forecasting system 100 may be a network-based specialized computer environment configured to process a large amount of data, e.g., to forecast demands for a large number of items at an organization level (e.g., inventory forecast for a commercial store or e-business, spare parts forecast for an auto company). As illustrated in FIG. 1, the big data time series forecasting system 100 may include one or more specialized computers or other machines that are configured to collect, transmit, distribute, and/or processes data received by the system. For example, the big data time series forecasting system 100 may include one or more general network devices 103, such as network devices, that may communicate with other components of the system through a data communication interface device 111. For example, network devices 103 may collect and send data to the data communication interface device 111 to be processed, and/or may send signals to the data communication interface device 111 to control different aspects of the system or the data it is processing, among other reasons. Network devices 103 may interact with the data communication interface device 111 through several ways, for example, over one or more networks 109. As shown in FIG. 1, data communication interface device 111 may include one or more other systems. For example, data communication interface device 111 may include a communications grid 113 for setting up communications with the network devices 103 and a database system 115 for storing data received and/or generated during the data processing processes.

In some embodiments, the network devices 103 may provide a large amount of data, either all at once or streaming over a period of time, to the data communication interface device 111 via networks 109. For example, network devices 103 may include network computers, sensors, databases, or other devices that may transmit or otherwise provide data to the data communication interface device 111. These devices may provide a variety of collected, generated, and/or stored data, such as network data or data specific to the network devices themselves.

In some embodiments, in addition to collecting data (e.g., as received from network devices, such as sensors or other sources) to be processed as part of a big data analytics project, network devices 103 may also receive data in real-time as part of a streaming analytics environment. For example, data may be collected using a variety of sources as communicated via different kinds of networks or locally. Such data may be received on a real-time streaming basis. For example, in some embodiments, network devices 103 may include specialized sensors that monitor their environment or other devices to collect data regarding that environment or those devices, and such network devices may provide data they collect over time. For example, network devices 103 may receive data periodically from network device sensors as the sensors continuously sense, monitor, and track changes in their environments (e.g., inventory monitoring systems). Such network devices 103 may include handheld or other mobile devices that include sensors to allow users to scan inventory products one-by-one or as a batch. After the inventory count, network device 103 may synchronize the collected data with the other components through the data communication interface device 111. In some embodiments, network devices 103 may also include devices within the internet of things (IoT), such as devices within a home automation network. Some of these devices may be referred to as edge devices and may involve edge computing circuitry.

In some embodiments, network devices 103 may also perform processing on data it collects before transmitting the data to data communication interface device 111, or before deciding whether to transmit data to data communication interface device 111. For example, network devices 103 may determine whether data collected meets certain rules, for example, by comparing data or values calculated from the data and comparing that data to one or more thresholds. Network devices 103 may use this data and/or comparisons to determine if the data should be transmitted to data communication interface device 111 for data handling and/or processing. Data with or without processing may be transmitted by network devices 103 directly to data communication interface device 111 or network-attached data store, such as network-attached datastore 119 for storage so that the data may be retrieved later by the data communication interface device 111 or other portions of big data time series forecasting system 100.

Big data time series forecasting system 100 may also include one or more network-attached datastore 119. Network-attached datastore 119 may be configured to store data managed by the data communication interface device 111 as well as any intermediate or final data generated by the forecast system 100 in non-volatile memory. However, in certain embodiments, the configuration of the data communication interface device 111 allows its operations to be performed such that intermediate and final data results may be stored solely in volatile memory, without a requirement that intermediate or final data results be stored to non-volatile types of memory, e.g., database system 115 or network-attached datastore 119. This may be useful in certain situations, such as when the data communication interface device 111 receives ad hoc queries from a user and when responses, which are generated by processing large amounts of data, need to be generated on-the-fly. In this non-limiting situation, the data communication interface device 111 may be configured to retain the processed information within memory so that responses may be generated for the user at different levels of detail as well as allow a user to interactively query against this information.

Network-attached datastore 119 may store a variety of different types of data organized in a variety of different ways and from a variety of different sources. For example, network-attached datastore 119 may store unstructured (e.g., raw) data, such as manufacturing data (e.g., a database containing records identifying products being manufactured with parameter data for each product, such as colors and models) or product performance databases (e.g., a database containing individual data records identifying details of individual product performance). The unstructured data may be presented to the data communication interface device 111 in different forms such as a flat file or a conglomerate of data records, and may have data values and accompanying timestamps. The data communication interface device 111 may be configured to analyze the unstructured data in a variety of ways to determine the best way to structure (e.g., hierarchically) that data, such that the structured data is tailored to a type of further analysis that a user wishes to perform on the data. For example, after being processed, the unstructured timestamped data may be aggregated by time (e.g., into daily time period units) to generate time series data and/or structured hierarchically according to one or more dimensions (e.g., parameters, attributes, and/or variables). For example, data may be stored in a hierarchical data structure, or may be stored in another tabular form.

Big data time series forecasting system 100 may also include a time series forecasting server 101. Data communication interface device 111 may route certain communications or data to time series forecasting server 101. Time series forecasting server 101 may be configured to process received data and/or provide feedback or other information according to a predetermined manner. For example, time series forecasting server 101 may access data stored therein for transmission in response to a communication (e.g., an inquiry). Time series forecasting server 101 may be separately housed from each other device within the big data time series forecasting system 100, such as data communication interface device 111, and/or may be part of a device or system, e.g., may be integrated with data communication interface device 111 to form an integrated server.

In some embodiments, time series forecasting server 101 may host a variety of different types of data processing as part of big data time series forecasting system 100, as will be described more in detail later. In addition, time series forecasting server 101 may also receive a variety of different data from network devices 103, from data communication interface device 111, from cloud services unit 117, or from other sources. The data may have been obtained or collected from one or more sensors, as inputs from a control database, or may have been received as inputs from an external system or device. Time series forecasting server 101 may assist in processing the data by turning raw data into processed data based on one or more rules implemented by the server.

Big data time series forecasting system 100 may also include one or more cloud services units 117. Cloud services unit 117 may include a cloud infrastructure system that provides cloud services. In some embodiments, the computers, servers, and/or systems that make up the cloud services unit 117 are different from a user or an organization's own on-premise computers, servers, and/or systems. For example, the cloud services unit 117 may host an application (e.g., a time series forecasting application 105p), and a user may, via a communication network such as the Internet, order and use the application on-demand. In some embodiments, services provided by the cloud services unit 117 may include a host of services that are made available to users of the cloud infrastructure system on-demand. In addition, services provided by the cloud services unit 117 may dynamically scale to meet the needs of its users. For example, cloud services unit 117 may house one or more time series forecasting applications 105p for big data processing, which may be scaled up and down based on the amount of data to be processed. For example, for a next-year demand forecast performed at year-end that may require a more comprehensive or extensive item-by-item demand evaluation, the cloud services on demand may be on-demand and/or scaled up.

Cloud services unit 117 is shown in FIG. 1 as being connected to data communication interface device 111, but in real applications cloud services unit 117 may be connected to or utilized by any of the devices in FIG. 1, e.g., by the network devices 103, and/or by time series forecasting server 101 as a part of the extension of the server.

Each communication within big data time series forecasting system 100 (e.g., between network devices, between a device and connection management system 150, between servers 106 and data communication interface device 111 or between a server and a device) may occur over one or more networks 109. Networks 109 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or a combination of wireless interfaces. As an example, a network in one or more networks 109 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the system 100. The one or more networks 109 may be incorporated entirely within or may include an intranet, an extranet, or a combination thereof. In one embodiment, communications between two or more systems and/or devices may be achieved by a secure communications protocol, such as secure sockets layer or transport layer security. In addition, data and/or transactional details may be encrypted.

Some aspects may utilize the IoT, where things (e.g., machines, devices, phones, sensors) may be connected to networks and the data from these things may be collected and processed within the IoT and/or external to the IoT. For example, the IoT may include sensors in many different devices, and high-value analytics may be applied to identify hidden relationships and drive increased efficiencies. This may apply to both big data analytics and real-time analytics.

As noted, data communication interface device 111 may include a communications grid 113 and a database system 115. Communications grid 113 may be a grid-based computing system for handling and/or distributing large amounts of data into a proper component for processing. For example, communication grid 113 may distribute one type of time series data to a time series forecasting server specially configured for processing statistically forecastable time series data, and distribute another type of time series data to a time series forecasting server specially configured for processing non-statistically forecastable time series data. For another example, communication grid 113 may distribute time series data to cloud services unit 117 when it finds that time series forecasting server 101 is busy with processing other data.

The database system 115 may be for managing, storing, and retrieving large amounts of data that are distributed to and stored in the one or more network-attached datastore 119 or other datastores that reside at different locations within database system 115. The computing nodes in the grid-based computing system 113 and the database system 115 may share the same processor hardware, such as processors that are located within data communication interface device 111.

While each device, server, and system in FIG. 1 is shown as a single device, it will be appreciated that multiple devices may instead be used. For example, a set of network devices may be used to transmit various communications from a single user or different users, or time series forecasting server 101 may include a server stack. As another example, data may be processed as part of data communication interface device 111. As yet another example, data communication interface device 111 may be a part of time series forecasting server 101, and cloud services unit 117 and/or network-attached datastore 119 may be not included in big data time series forecasting system 100.

Figure 2:
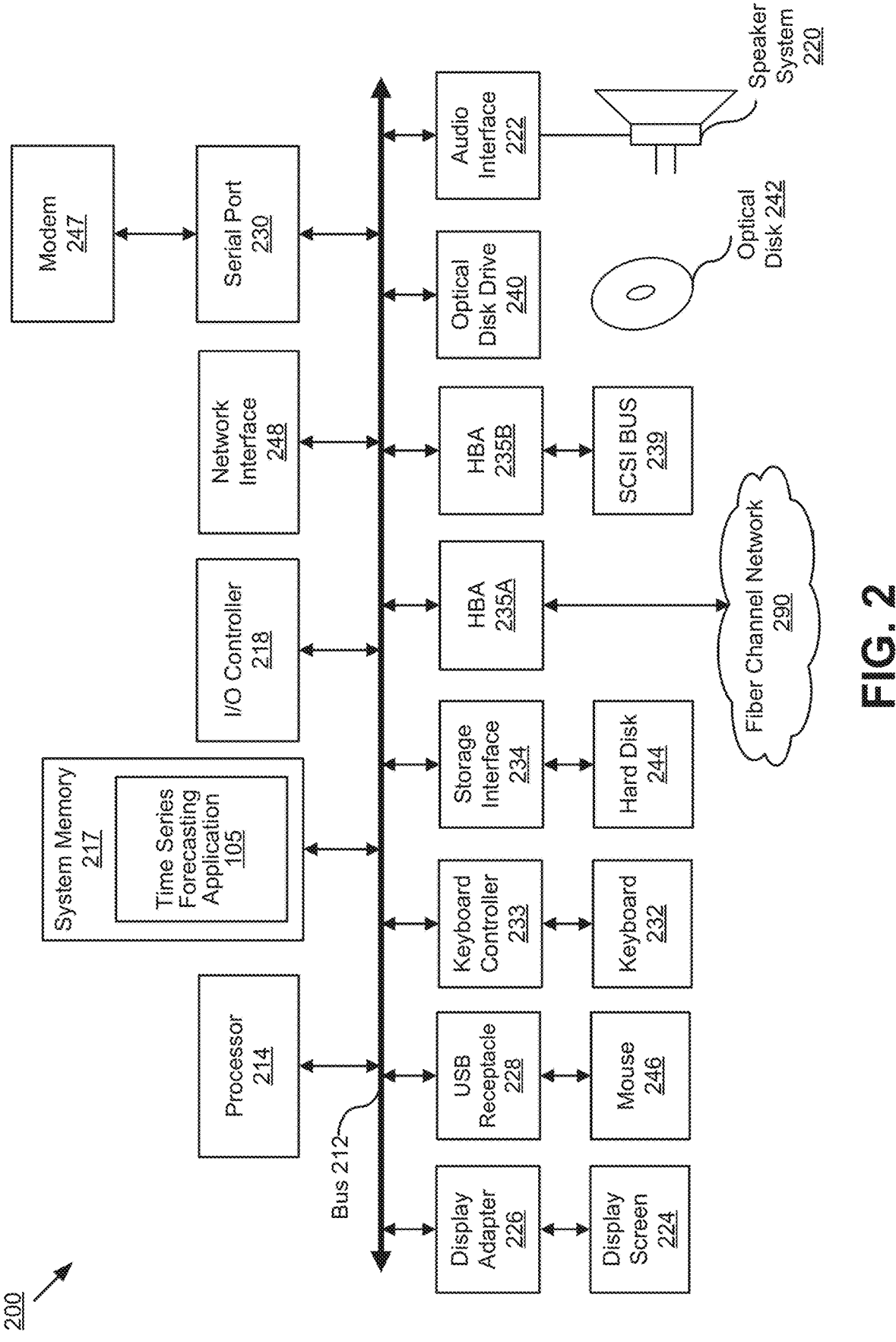
FIG. 2 is a block diagram of an example computer for a big data time series forecasting system, according to embodiments of the disclosure.

FIG. 2 is a block diagram of a computer system 210 suitable for implementing a time series forecasting application 105. Both network devices 103 and time series forecasting server 101 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media such as solid state drives (SSDs)), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or another pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The storage interface 234 is coupled to one or more hard disks 244 (and/or other standard storage media such as SSDs). The hard disk(s) 244 may be a part of computing device 210, or may be physically separate and accessed through other interface systems. The network interface 248 and or modem 247 can be directly or indirectly communicatively coupled to a network 107 such as the internet. Such coupling can be wired or wireless.

Bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer-readable medium (e.g., hard disk 244, optical disk 242) and loaded into system memory 217 and executed by the processor 214. Application programs can also be loaded into system memory 217 from a remote location (i.e., a remotely located computing device 210), for example via the network interface 248 or modem 247. In FIG. 2, the time series forecasting application 105 is illustrated as residing in system memory 217. The workings of the time series forecasting application 105 are explained in greater detail below in conjunction with FIGS. 3-7.

FIG. 3 illustrates example modules included in a time series forecasting application 105, according to embodiments of the disclosure. As illustrated in the figure, a time series forecasting application 105 may include a domain-based segmentation module 301, a time series clustering module 303, a cluster-level forecast module 305, an item-level forecast module 307, and a forecast evaluation module 309. In some embodiments, depending on the applications and/or configurations, time series forecasting application 105 may include more or fewer modules than those illustrated in FIG. 3. For example, cluster-level forecast module 307 may additionally include an overall regression module and an external variable regression module (not shown in FIG. 3).

The modules 301-309 may include software modules, hardware modules, or a combination thereof. If the modules are software modules, the modules may be tangibly embodied as programs, codes, or logic stored on a non-transitory machine-readable storage medium, which are then processed by a processor in any of the computer systems described herein. It is to be noted that any module or datastore described herein may be a service responsible for managing data of the type required to make corresponding calculations. In addition, these modules may exist as end-to-end modules within a single time series forecasting application 105 (e.g., within a single time series forecasting application 105*o* in time series forecasting server 101) or may exist as separate modules or services. For example, some of the modules 301-309 may be included in network devices 103*a* . . . 103*n*, and/or cloud services unit 117. As further described in more details below, the modules 301-309 may be directed to performing instructions of a single time series forecasting application 105, to implement the time series forecasting processes, resulting in improved computational performance of the computer system 210 during operations of predictive modeling.

In the following and throughout the specification, the term "prediction" or "predicting" as used herein may be used interchangeably with or to mean the term "forecast" or "forecasting" as used herein. The term "time period" or "time period of the year" as used herein may be used interchangeably with or to mean the term "season" or "seasonality" as used herein. In addition, the term "upcoming" as used herein may be used interchangeably with or to mean the term "future" as used herein. Furthermore, the term "amount" as used herein may be used interchangeably with or to mean the term "volume" as used herein. Furthermore, the term "object" or "item" as used herein may be used interchangeably with or to mean the term "product" as used herein.

Domain-based segmentation module 301 may be configured to segment time series data into statistically forecastable or non-statistically forecastable data when performing time series forecasting. In real applications, given a long product line, finding products with low or scarce demand is ubiquitous. Time series forecasting for these low or scarce demand items might result in poor statistical predictions due to insufficient demand data for prediction using advanced statistic techniques and/or due to more likely large random variations. On the other hand, reliable predictions can be generated if there is a sufficient amount of data. Domain-based segmentation module 301 can thus be configured to segment or differentiate these time series data to minimize the effects of random variation in data, for example, by segmenting time series data into statistically forecastable or non-statistically forecastable data. Here, statistically forecastable data may correspond to items that have abundant time series data (e.g., abundant sales data), which can be utilized to forecast further demands by using advanced statistic techniques, e.g., machine learning models. On the other hand, non-statistically forecastable data may correspond to items that have scarce or rarely available demand data, which may lead to inaccurate forecasting results if similar advanced statistical techniques are applied. In some embodiments, by separating these time series data from the statistically forecastable data, it can be ensured that advanced statistic techniques purposed for statistically forecastable data will not be applied to the non-statistically forecastable data, which results in improved computational performance of the computer system 210, e.g., increased accuracy during operations of predictive modeling.

In some embodiments, domain-based segmentation module 301 may implement different techniques to segment time series data into statistically forecastable data or non-statistically forecastable data. In one example, domain-based segmentation module 301 may check whether the sale data for an item is enough for a machine learning model designed for time series forecasting of statistically forecastable items. In general, a machine learning model may require at least a certain amount of input data for training and testing algorithm(s) included in the model before being applied to actual applications. If a time series data does not provide sufficient sales information that can ensure a meaningful training and testing of a machine learning model, the time series data may be segmented into a non-statistically forecastable segment. On the other hand, if the sales information of an item has enough data for training and testing of a machine learning model configured for time series forecasting, the time series data for that item may be segmented into a statistically forecastable segment.

In some embodiments, depending on domain-by-domain, different timespan may be used to determine whether the sales information is enough or not. For example, for regular items that are used in everyday life, sales information of 6 months or less may be enough. However, for seasonal items that are generally used on certain specific days, sales information of 12 months or even longer may be necessary. In some embodiments, due to global climate change or other certain factors, sales information for some items may require an even longer time, such as 18 months, 24 months, etc., depending on different their actual applications.

In some embodiments, domain-based segmentation module 301 may separate items into fast movers or slow movers according to the consumption rate, inventory quantity, and the rate at which the inventory of each item is used. Fast movers, as the name suggests, may include items that move quickly in stock and need to be replenished every often. In some embodiments, the items in this category also have a high inventory turnover ratio, e.g., 3 or more. Here, an inventory turnover ratio may be calculated by dividing the cost of an item by average inventory for the same period. A higher ratio tends to point to strong sales and a lower ratio points to weak sales. For slow movers, their stocks may crawl slowly through the supply chain. The items in this category may have a low inventory turnover rate, e.g., between 1-3. In some embodiments, there is one additional category of items that have a non-moving inventory. The items in this category may have an inventory turnover ratio of 1 or less, and may be referred to as non-movers. In some embodiments, different time series forecasting models may be applied for forecasting demands for fast movers, slow movers, or non-movers. For example, certain machine learning models configured for the statistically forecastable time series data may be used for demand forecast for the fast movers, while certain other models may be applied to the slow movers and non-movers.

It should be noted that the above categorization of fast movers, slow movers, or non-movers is merely for illustrative purposes. In some embodiments, there may be only two segments instead. For example, an inventory turnover rate higher than a certain value (e.g., 2) may be considered as a fast mover, and an inventory turnover rate equaling to or less than such value is then considered as a slow mover. Accordingly, machine learning models configured for statistically forecastable time series data may be used for demand forecast for the fast movers, while certain other models, such as Simple Moving Average, may be used for demand forecast for the slow movers.

In some embodiments, by segmenting time series data and/or corresponding items into different segments, factors suitable for different segments may be considered to choose suitable models that work best for each corresponding segment in demand forecasting.

Time series clustering module 303 may be configured to group a large number of time series data into different clusters based on similar demand patterns. In addition, time series clustering module 303 may aggregate time series within a cluster to generate an aggregate time series that can be a good presentation of its child time series in the cluster. At this point, instead of forecasting each time series data included in the cluster, just the aggregate time series may be forecasted for the whole cluster, which greatly reduces the runtime and computation resources for demand forecasting of all the items included in the cluster. Here, the forecasted demand pattern for the aggregate time series may represent and reflect the demand pattern for each child time series included in the cluster.

Figure 4:
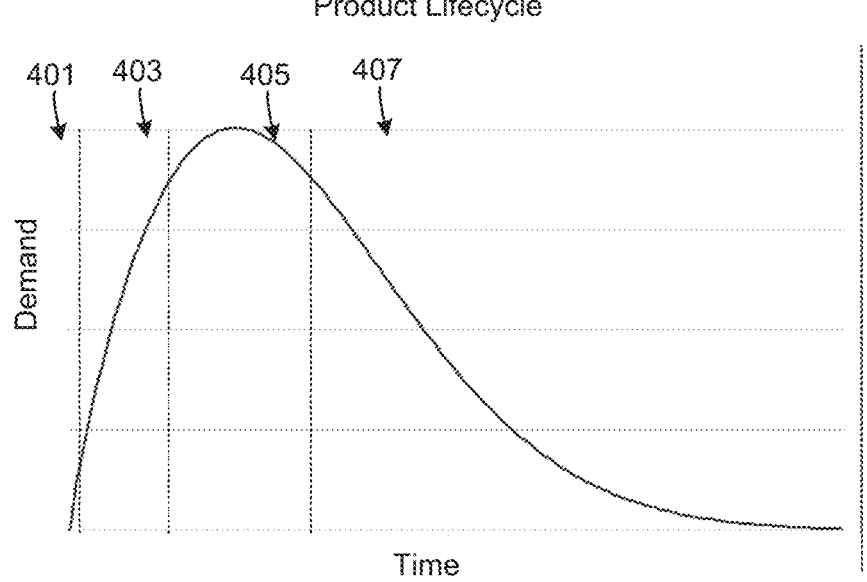
FIG. 4 shows an example graph illustrating a lifecycle of an item, according to embodiments of the disclosure.

In some embodiments, time series clustering module 303 may employ lifecycles of items in grouping time series data into clusters. Here, a lifecycle of an item may represent the actual demand of the item during different time periods after its launch on the market. FIG. 4 illustrates an example lifecycle of an item, according to embodiments of the disclosure. As illustrated, the lifecycle of an item may include an introduction stage 401, a growth stage 403, a maturity stage 405, and a decline or withdrawal stage 407, where each stage may signify the progress of an item in the market. For example, for a product in the market, the introduction stage 401 may be a product launching stage, during which the demand for the product is typically low and grow slowly. The growth stage 403 may be a stage where the demand for the product grows quickly, e.g., exponentially. The maturity stage 405 may be a stage where the market grows to capacity and the demand remains stable. The decline or withdrawal stage 407 may be a stage where the demand for the product starts to fall. It should be noted that, in some embodiments, there are no clear border lines between the four different stages. For example, the product demand may begin to decline at the late stage of the maturity stage 405, as shown in FIG. 4.

It should be also noted that for different items or products, each of the introduction stage 401, growth stage 403, maturity stage 405, and decline or withdrawal stage 407 may have different timespans, and thus different items may show different lifecycles and the corresponding demand patterns. However, considering a large number of items at an organization level, it is not surprising to see many items exhibiting similar lifecycles and demand patterns. These items exhibiting similar lifecycles and demand patterns can be then grouped into a same cluster in time series-based demand forecasting. In some embodiments, time series data collected by the network devices 103 for an item, when pooled together and collated together, may be historical timestamped data that represents a part of the lifecycle of the item (e.g., until the day the data are pooled) when the pooled and collated data are plotted in a time plot.

In some embodiments, time series clustering module 303 may apply different models to cluster time series data based on the lifecycles. For example, time series clustering module 303 may apply distance-based models to cluster lifecycles that show similarities. In distance-based clustering, (dis) similarity measure between time series is defined, and then distances are introduced in some manner with distance-based classification methods such as the k-nearest neighbor classifier (k-NN) or support vector machines (SVMs). Time series with the distance within a certain threshold may be then clustered together as a single cluster. In some embodiments, different time series distance measures may be employed, such as lock-step measures and elastic measures. In lock-step measures, distances are measured by comparing the $i^{th}$ point of one series to the $i^{th}$ point of another series. One such example is Euclidean distance. In elastic measures, distances are measured by creating a nonlinear mapping to align the series and allow the comparison of one-to-many points. One such example is dynamic time warping (DTW). It should be noted that there are other distance-based clustering processes or even some non-distance-based clustering processes available for time series clustering.

In some embodiments, time series clustering module 303 may perform certain corrections before the clustering process, to allow different time series to be grouped into proper clusters. For example, time series clustering module 303 may perform variance correction and/or bias correction on the time series before the clustering process. For variance correction, time series clustering module 303 may smooth certain time series by using moving average or other similar techniques, so as to highlight common features of the demand in a formed cluster. Here, a moving average is a calculation used to analyze data points by creating a series of averages of different subsets of the full data set. By calculating the moving average, the impacts of random, short-term fluctuations of the time series data over a specified time frame can be mitigated. Smoothing therefore may be done to capture common crests and troughs and ignore individual demand peaks, to help see patterns, trends in time series better. For example, for seasonal data, the seasonality may be smoothed out, to allow identification of the trend.

For bias correction, time series clustering module 303 may perform normalization to capture demand patterns across products, irrespective of the scale of the products. Normalization is a rescaling of the data from the original range so that all values are within a defined range. In one example, products with very high demand may possess similar demand patterns when compared to products with low demand. Bias correction can scale time series to be within a same range, which helps focus on extracting demand curve patterns without considering the scale of the time series. In some embodiments, normalization can be a min-max scaling, where all values are rescaled to a range between 0 and 1, although other scaled ranges are also possible. Normalization can be useful, and even required in some machine learning algorithms when time series data has input values with differing scales. It may be required for algorithms, like k-Nearest neighbors, which use distance calculations and linear regression and artificial neural networks that weigh input values. The smoothed and normalized time series may be then subject to the above-described clustering techniques to cluster the time series received from the network devices 103 into different clusters.

Figure 5A:
FIG. 5A shows example graphs illustrating a clustering process, according to embodiments of the disclosure.
Figure 5A:
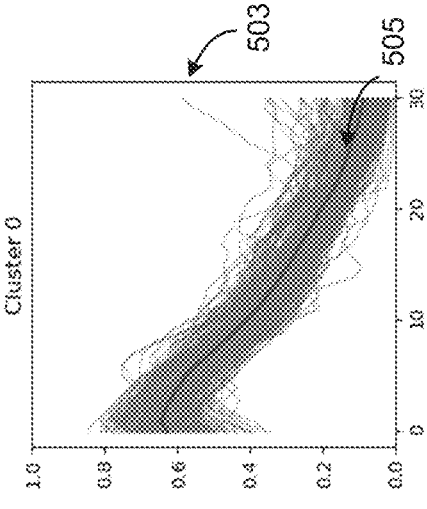
Figure 5A:
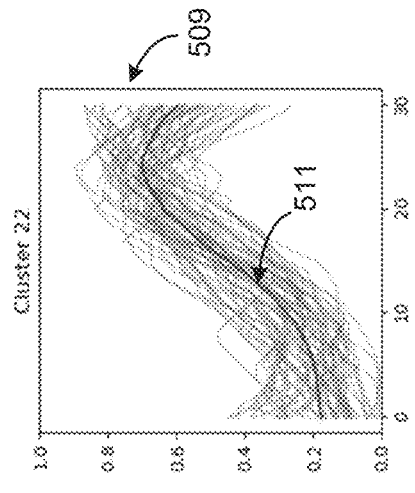
Figure 5A:
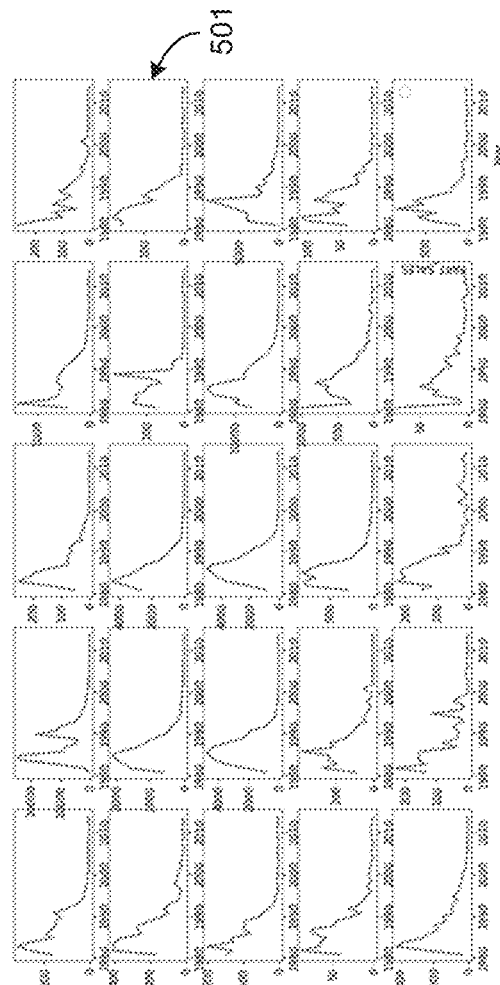
Figure 5A:
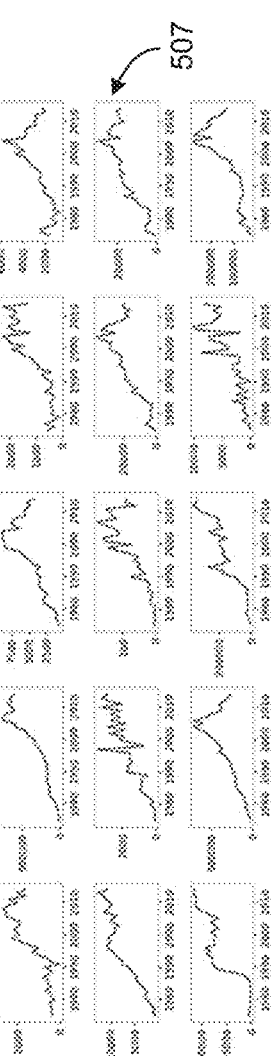
Figure 5B:
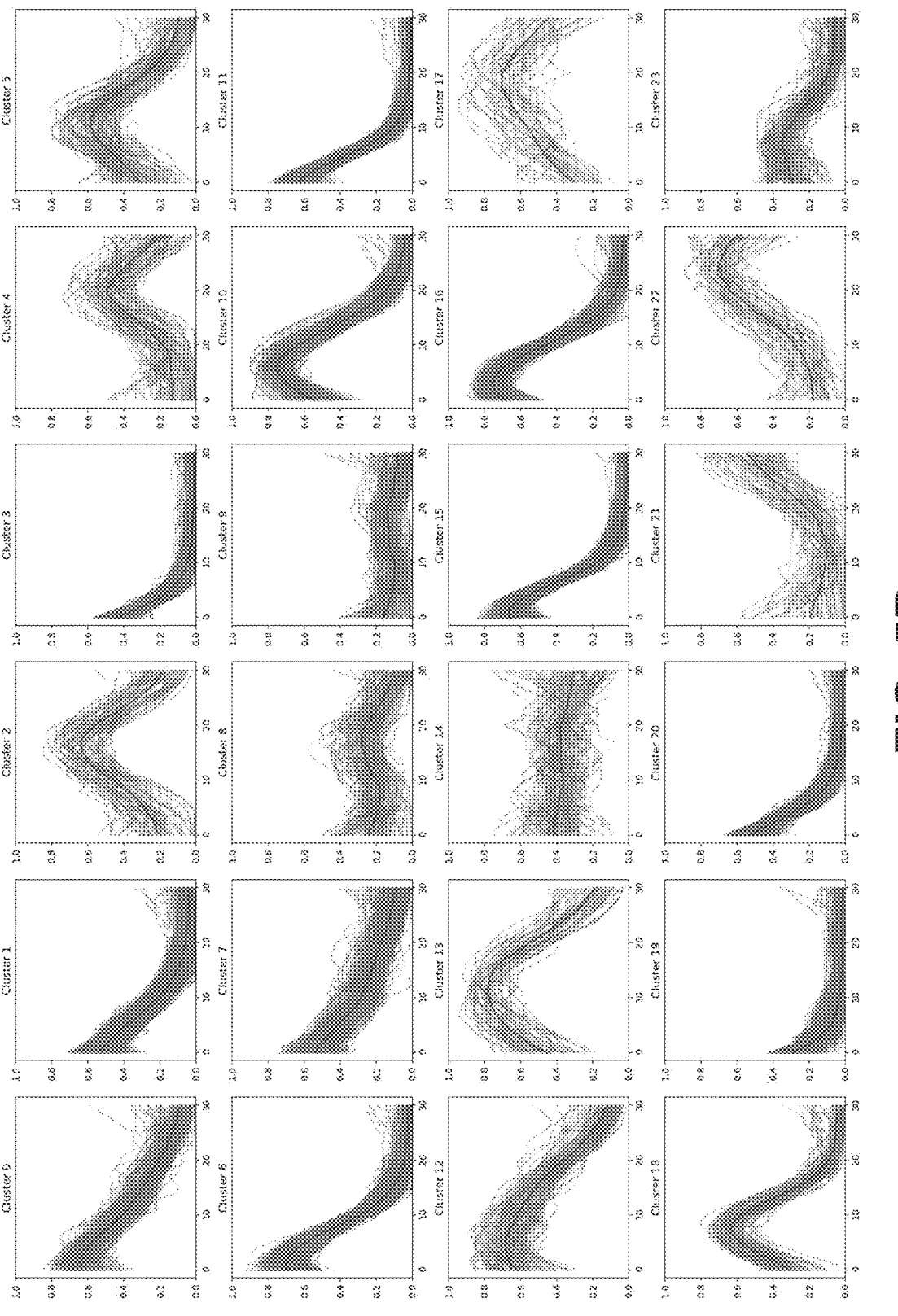
FIG. 5B shows example graphs illustrating different clusters of time series, according to embodiments of the disclosure.

FIG. 5A shows example graphs illustrating a clustering process, and FIG. 5B shows example graphs illustrating different clusters of time series, according to embodiments of the disclosure. As shown in graph 501 in FIG. 5A, 25 time series data after time plotting show similarities. These time series data may be clustered into a same cluster based on the distance-based clustering, as can be seen from graph 503 in FIG. 5A. Within the cluster, a representative time series 505 (which may be an average time series) may be generated. The generated representative time series 505 may represent all time series (which may be referred to as child series in the cluster) included in the cluster in demand forecasting of the corresponding items. In some embodiments, another aggregate time series (not shown in FIG. 5A) may be also generated by adding all time series data in each time point together. Graph 507 illustrates another 15 time series data that also show certain similarities after time plotting. These 15 time series may be also clustered together, as illustrated in graph 509 in FIG. 5A. Another average time series 511 and aggregate time series (not shown) may be similarly generated, which may represent all time series included in the cluster in demand forecasting. From FIG. 5A, it can be seen that while lifecycles in each cluster show similarities, the lifecycles in different clusters show a certain difference.

FIG. 5B shows some example clusters after a clustering process, according to embodiments of the disclosure. As can be seen, for different products or in an organization, after the clustering (e.g., a distance-based clustering) process, the time series data of these different products may be grouped into 24 clusters, with each cluster including an aggregate time series or average time series representing the child time series in each cluster. From the figure, it can be also seen that after the clustering process, the total number of forecasting units is drastically reduced, since the time series based demand forecasting can now be focused just on the aggregate time series or average time series (for simplification, only one of the two will be illustrated in later applications) at the cluster level.

Cluster-level forecast module 305 may be configured to forecast demand at the cluster level by forecasting the demand for an aggregate time series. The demand forecast at the cluster level may be similar to the demand forecast for a single time series, since an aggregate time series may be representative of each item included in a cluster. In some embodiments, different time series forecasting techniques may be applied here. For example, to increase the accuracy, a machine learning-based two-step regression model may be employed in time series forecasting of the aggregate time series at the cluster. Here, the two-step regression may include a first-step nonlinear regression configured to capture an overall trend of the demand for the aggregate time series, and a second-step linear regression configured to take into consideration of external variables, as further described in details below. In some embodiments, the obtained two-step regression model may be trained and tested through machine learning-based techniques before being applied to time series forecasting.

In one example, an algorithm for the first-step nonlinear regression may include or be based on the following Equation 1:

$$f(t) = \frac{\gamma}{\alpha}\left(\frac{t}{\alpha}\right)^{\gamma-1} e^{\left(-\left(\frac{t}{\alpha}\right)^{\gamma}\right)} t \geq 0 \tag{1}$$

where $\gamma>0$ is the shape parameter and $\alpha>0$ is the scale parameter, both of which can be optimized, e.g., through a machine learning-based training process and testing process, to achieve the optimal values for the two parameters to obtain the ideal shape and scale that match time series data, e.g., matching the historical demand pattern represented by a part of a lifecycle (e.g., left part matching the historical time points) of an item shown in FIG. 4.

In some embodiments, the machine learning process for obtaining the scale and shape parameters for the above Equation 1 may be supervised training. During the training process, a first set of time point data reflecting the earlier part of a lifecycle (e.g., time series data points corresponding to the first six months) may be used as input data for the training process. A second set of time point data reflecting a later part of the lifecycle (e.g., time series data points corresponding to the seventh month) may be used as input data for the testing process. Through the training and testing processes, the scale and shape parameters may be determined and used for predicting future demand (e.g., predict demands for the time points after the seventh month). The determined shape and scale parameters may improve the performance of the above nonlinear regression in relation to some measure of the performance (e.g., accuracy in predicting demand for some products). The equation with the optimized parameters may be considered as a model, or more specifically a prediction model that can be applied to predict the demand for a product at a future time interval.

In some embodiments, for a plurality of clusters obtained by time series clustering module 303, a model family can be achieved, where each model in the model family may be used to predict demand for one cluster or a set of clusters that show certain similarities. For example, for the 24 clusters illustrated in FIG. 5B, there may be 24 trained models that can be applied to predict the demand for the time series included in the corresponding cluster. The 24 models may have a different set of scale and shape parameters for the above Equation (1). It should be noted that in real applications, there may be many more trained prediction models that have been developed and dynamically updated. To predict the demand for time series data, the time series data may be used to identify a proper model in the family. The selected model may fit best with the currently available time series data, which may be then applied to predict a future demand based on the currently available time series data.

Figure 6A:
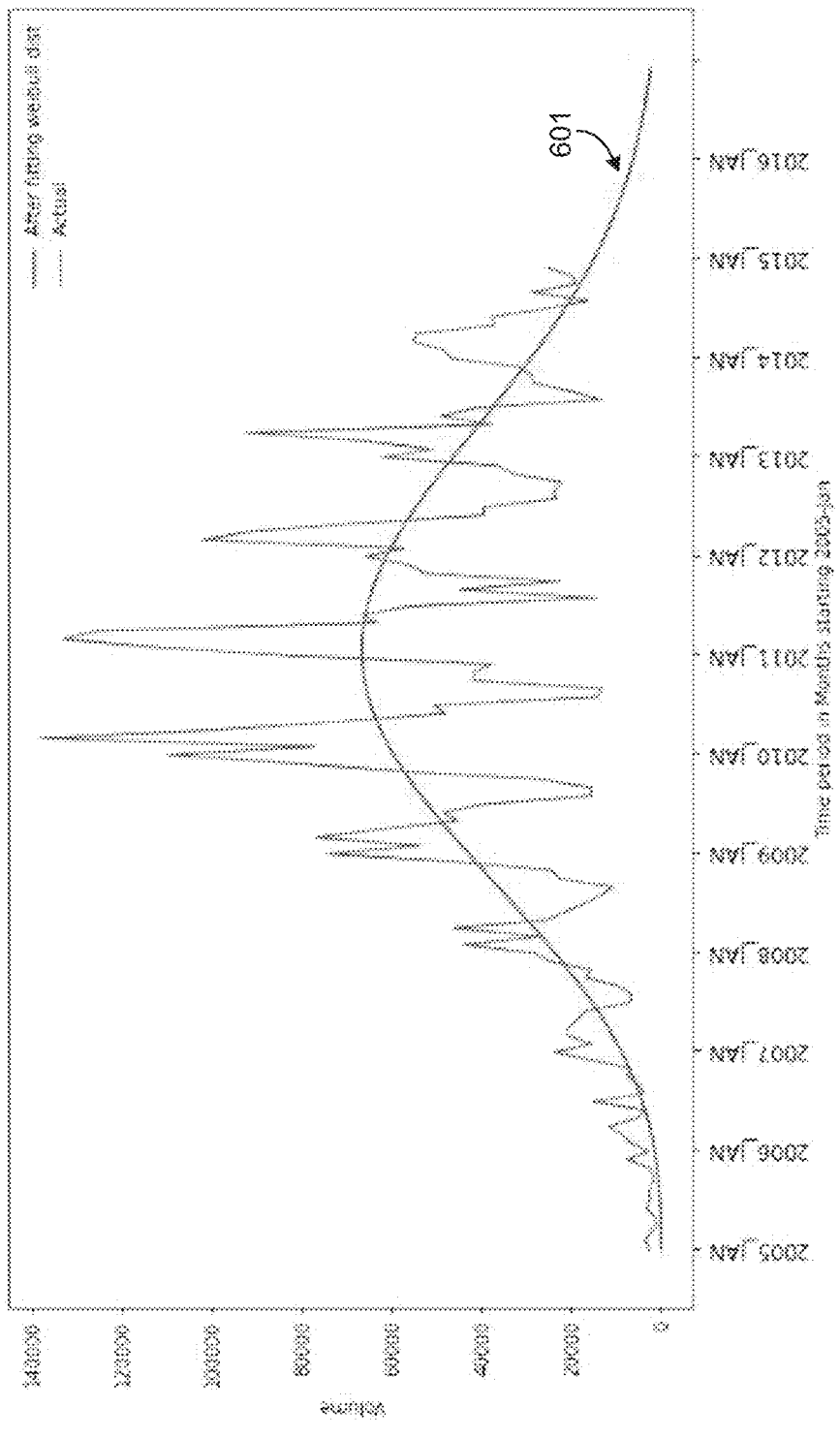
FIG. 6A shows an example graph illustrating a nonlinear regression of time series data, according to embodiments of the disclosure.

FIG. 6A shows an example graph illustrating a nonlinear regression of time series data, according to embodiments of the disclosure. As illustrated in FIG. 6A, when Formula (1) is used to fit the data in data point in FIG. 6A, a regression curve 601 may be obtained, and the corresponding shape and scale parameters may be determined accordingly.

In some embodiments, while the prediction model based on the nonlinear regression shown in FIG. 6A may capture the overall demand trend well, such a prediction model may not capture the fluctuations that may frequently happen. Accordingly, cluster-level forecast module 305 may further implement a second regression of the two-step regression. The second regression may be a linear regression that is configured to capture the fluctuations or other external variables such as installed base, average age of the installed base, etc. Here, the installed base is defined as the whole set of systems/products a company has sold and which are still in use. Examples of an installed base for a product include the number of a specific model of computer a computer company has sold under its name, an automobile model manufactured and sold by an automobile company, etc.

According to one embodiment, the linear aggression for the second-step regression may be based on the following Equation (2):

$$g(x) = m_1 f(t) + m_2 x_2 + m_3 x_3 \qquad (2)$$

where $x_2$ and $x_3$ are two predictor variables, each of which may be numerical, and $m_1$, $m_2$, and $m_3$ are coefficients that measure the effect of each predictor variable into account the effects of all other predictors in the model. As can be seen, while Formula (2) is focused on the linear regression, the nonlinear regression $f(t)$ shown in Formula (1) may be also included in Formula (2), and thus Formula (2) may be a full prediction model that integrates both nonlinear regression and linear regression into the same model.

In some embodiments, the external variables present in Formula (2) may allow for customization according to various industry needs. For example, there might be certain events that affect the demand for certain products, which may not be captured by the nonlinear regression model shown in Equation (1). These different events may then be captured as the predictor variables by the linear regression models shown in Equation (2), as shown by predictor variables $x_2$ and $x_3$, and as further described in detail below.

In one example, the two predictor variables $x_2$ and $x_3$ shown in Equation (2) may represent two types of events, e.g., one-off events and repeating events, that may affect demand forecast. Here, one-off events are one-of-a-kind events, which will unlikely happen during a forecast horizon. For example, Covid-19 outbreak might be a reason for the product demand to show a steep dive or a country-wide curfew for a period due to political unrest can disrupt the consumption pattern of potential customers, effect of which may be inculcated in the model represented by Equation (2) and captured by the predictor variables $x_2$ and the corresponding coefficient $m_2$. Repeatable events may also be infused in the solution, thereby leveraging and learning any "mutation" a demand pattern might incur. For example, the predictor variable $x_3$ and the corresponding coefficient $m_3$ may capture the repeatable events that may affect demand patterns. In some embodiments, there are additional types of events, and thus additional predictor variables that may affect the forecast demand, which may be also added to the above Equation (2).

Figure 6B:
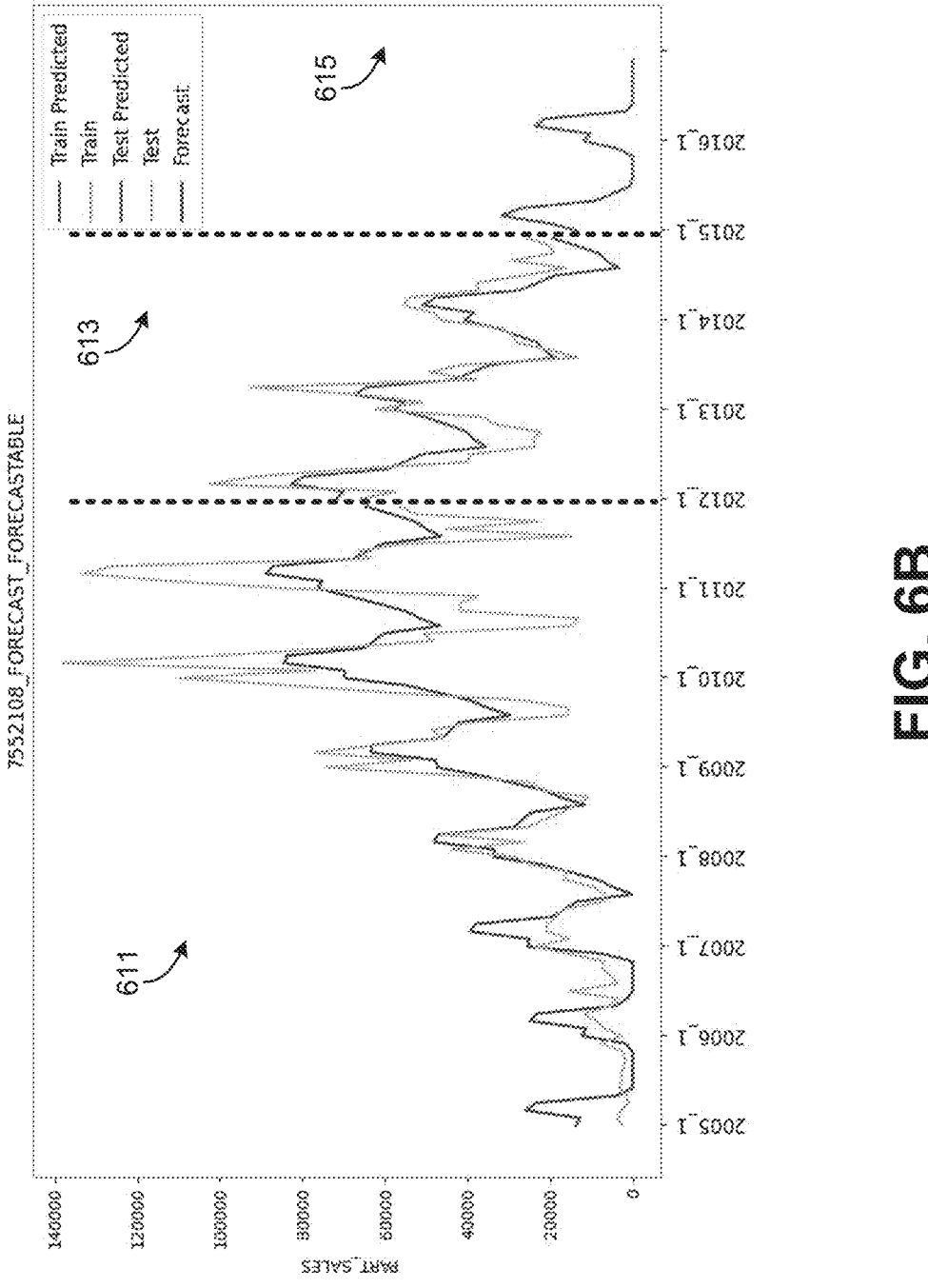
FIG. 6B shows an example graph illustrating a time series data-based training, testing, and prediction, according to embodiments of the disclosure.

FIG. 6B shows an example graph illustrating a time series data-based training, testing, and prediction, according to embodiments of the disclosure. As illustrated in FIG. 6B, a time series data may be divided into a first subset and a second subset corresponding to a first time interval 611 and a second time interval 613. The first subset of time series data may be used for the training purpose, while the second subset of time series data may be used for the testing purpose. The as-trained model may be then used to predict demand for the product for the third time period 615, as shown in the figure. It should be noted that, while FIG. 6A and FIG. 6B show example training processes by one set of time series data, in some embodiments, a prediction model may be trained by a plurality of time series data that shows a similar demand pattern.

Item-level forecast module 307 may be configured to determine the demand forecast for a specific item or product in a cluster. In one embodiment, an attach rate may be applied to determine the demand forecast for a specific product, where the attach rate may be defined as the proportion of the demand of a product with respect to the total demand of all the products present in the cluster. Accordingly, after obtaining the demand forecast at an aggregate level (e.g., based on the regression result determined by the cluster-level forecast module 305), the regression result may be distributed among products in the cluster according to the proportion of the historical contribution of each product (e.g., based on the corresponding attach rates). For example, if an item or product contributes to 1% of the aggregate time series during the clustering process, the attach rate for the item or product may be 1%, which may be used to determine the demand forecast for the product. That is, if the demand forecast for the aggregate time series at a future time point is determined to be A amount, the demand forecast for that specific item or product at that future time point is then A*1%. In some embodiments, the same process may be applied to determine the demand forecast for other items or products in the same cluster, so that the demand forecast at a future time point for all the items or products included in the cluster can be determined.

Forecast evaluation module 309 may be configured to check the possible errors for the demand forecasts determined for the items in a cluster. In some embodiments, different error estimation criteria may be applied by forecast evaluation module 309 to evaluate possible errors in demand forecast. For example, for the short-term forecast (e.g., the forecasting period is 2 years months or less), the mean absolute percentage error (MAPE) may be proper since the MAPE is focused more on individual data points. On the other hand, for the long-term forecast (e.g., the forecasting period is 15 years), bias may be used instead as it gives the overall accuracy over a long period of time.

MAPE, also known as mean absolute percentage deviation (MAPD), measures the accuracy of a method for constructing fitted time series values in statistics. MAPE usually expresses the accuracy as a percentage defined by the following Equation (3):

$$MAPE = \frac{100}{n} \sum_{t=1}^{n} \left| (A_t - F_t)/A_t \right| \qquad (3)$$

where $A_t$ is the actual value (e.g., eventual outcome) and $F_t$ is the forecast value, the difference of which is divided by the actual value $A_t$. The absolute value in this ratio is summed for every forecasted point in time and divided by the number of fitted points n. Because MAPE is a percentage, it can be easier to understand than other statistics. For example, if the MAPE for a specific prediction is 5, on average, the forecast is off by 5%, which means the demand forecast for the specific item is off by 5% when compared to the eventual outcome for that specific item or product. In some embodiments, when calculating the average MAPE for a number of time series, there may be some problems: a few of the time series that have a very high MAPE might distort a comparison between the average MAPE of a time series fitted with one method compared to the average MAPE when using another method. In some embodiments, other measures may be used to replace MAPE, which may include symmetric MAPE (SMAPE), weighted absolute percentage error (WAPE), real aggregated percentage error, relative measure of accuracy (ROMA), etc.

Bias, as another error indicator, represents the historical average error. In some embodiments, bias may be defined as the average error as shown in the following Equation (4):

$$\text{Bias} = \frac{1}{n} \sum_{n} (A_t - F_t) \qquad (4)$$

where n is the number of forecasted point in time where there are both a forecast and an actual demand (e.g., eventual outcome). In some embodiments, since a positive error on one time point can offset a negative error on another time point, a forecast model can achieve very low bias and not be precise at the same time. The bias alone therefore may be not enough to evaluate a forecast precision. However, a highly biased forecast generally indicates that something is wrong in the model.

Figure 7A:
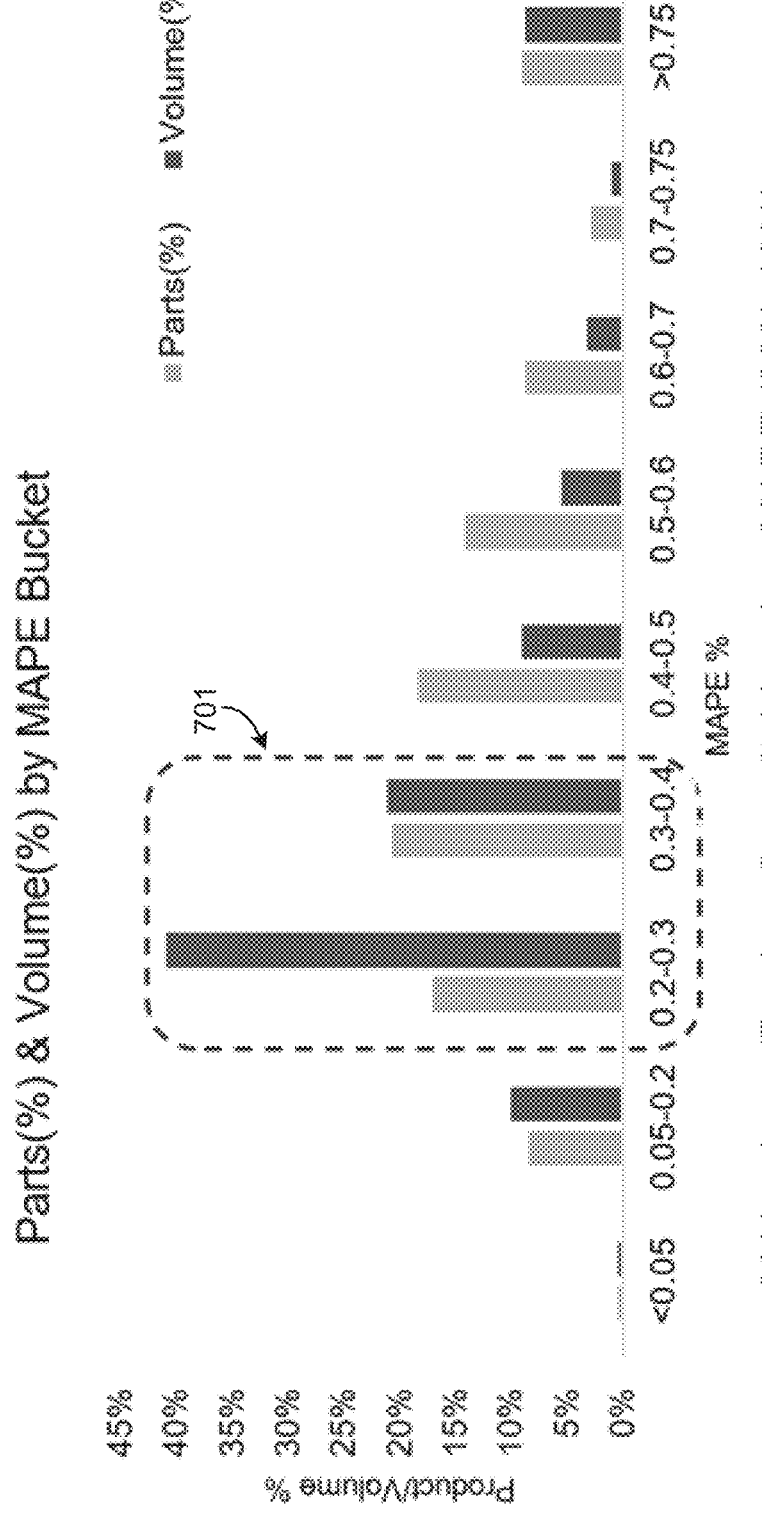
FIGS. 7A and 7B illustrate example errors measured for one time series forecasting, according to embodiments of the disclosure.
Figure 7B:
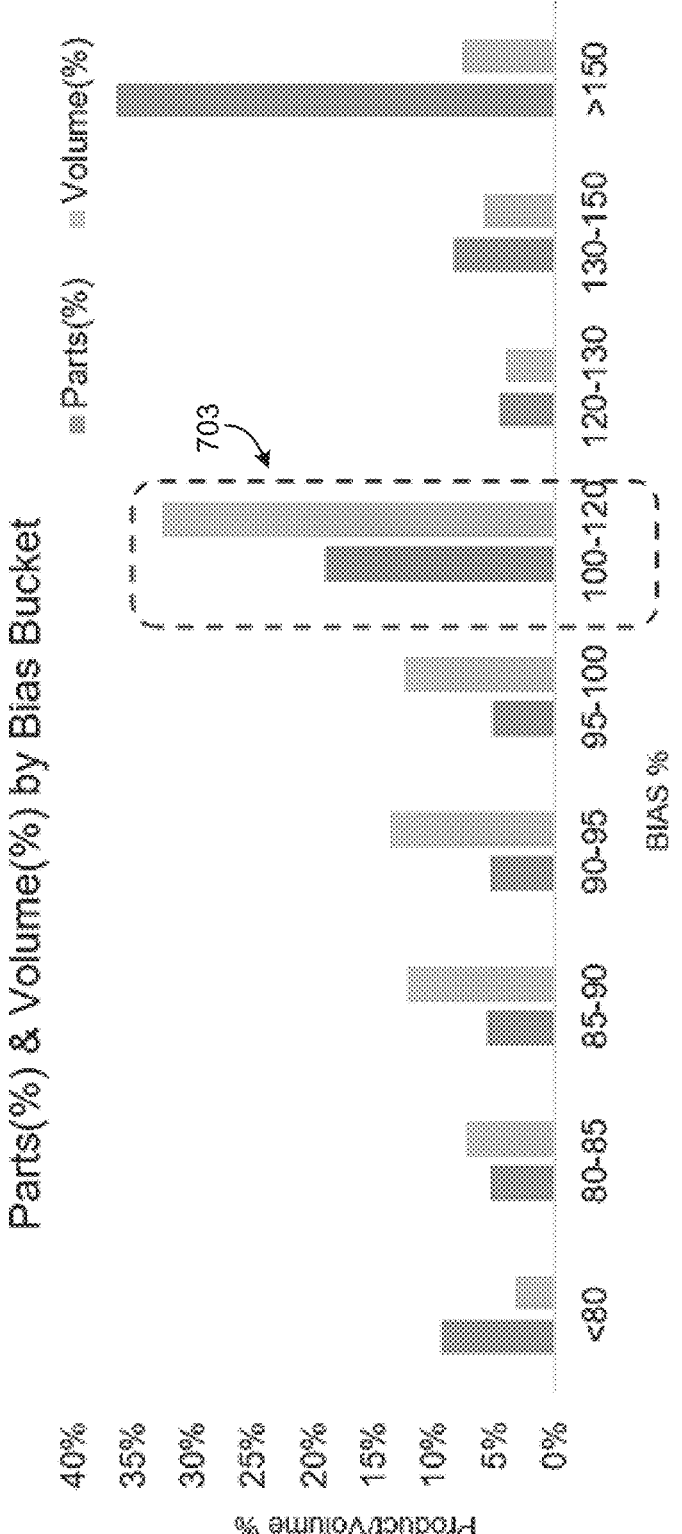

FIGS. 7A and 7B illustrate example errors measured for one time series forecasting according to a trained model based on Equation (2). As can be seen in FIG. 7A, over 60% of volume (or product quantity) has a low MAPE (e.g., MAPE between 20-40%), as indicated by box 701 in FIG. 7A. Similarly, FIG. 7B shows that the max volume (or product quantity) has a low Bias bucket (e.g., between 100-120), as indicated by box 703 in FIG. 7B. While some parts do have a high bias, the volumes for these parts are quite low (e.g., less than 5%).

Referring back to FIG. 3, time series forecasting application 105 may include additional modules other than those illustrated in FIG. 3. For example, time series forecasting application 105 may additionally include a number of prediction models for non-statistically forecastable time series, such as Simple Moving Average, and so on. The different modules and components included in time series forecasting application 105 may work together to allow an efficient and accurate time series forecasting of a large number of time series data, as further described in detail in FIG. 8.

FIG. 8 is a flow chart of an example method 800 for time series forecasting on a big data set, according to embodiments of the disclosure. Method 800 may be performed by various components included in big data time series forecasting system 100, e.g., time series forecasting server 101, network device 103, and/or cloud services unit 117. In some embodiments, method 800 may include steps S801-S817. It is to be appreciated that some of the steps may be optional. Further, some of the steps may be performed simultaneously, or in a different order than that shown in FIG. 8.

In step S801, network device(s) 103 may collect a large number of time series data, each representing a partial lifecycle of an item. The partial lifecycle for each item may be used to predict the remaining part of the lifecycle or future demand by using the described time series forecasting, as further described in detail below. The time series data for each item may be collected by network devices 103 through different approaches. In some embodiments, the data required for forecasting may already exist, and a forecaster's task is to identify where and how the required data are stored. The data may include sales records of a company, the historical demand for a product, etc. A large part of a forecaster's time may be spent in locating and collating the available data prior to implementing suitable forecasting methods. For example, an inventory system for an automobile manufacturing company may include inventory data for spare parts for the company. Similarly, an inventory system for an online or physical commercial or grocery store may include inventory for items sold by the store. Computer devices for managing these inventories may be considered as network devices 103 used in collecting data for time series forecasting.

In some embodiments, network devices 103 for time series data collection may also include other devices, such as IoT devices that instantly provide information about an item or a large number of items. For example, an IoT device may continuously report its status information and/or respond to certain controlling instructions/commands. Once this device is dysfunctional, it does not report its status information and/or respond to the controlling instructions/commands, which then indicates the product has ended its life on the market. In some embodiments, a handheld device or other types of remote devices may include sensor(s) to scan a stock-keeping unit (SKU) to check and record inventory for a specific item. Other example network devices for tracking and collecting inventory and status information for an item or product are also possible and not listed one-by-one. The information collected by these different network devices may also include timestamps for the collected data, which together provide time series data for a product or item. The collected time series data for each item or product may be then used for time series forecasting for future demand of the item or product. In some embodiments, if there are a large number of items or products (a large number of spare parts for an automobile manufacturing company or a large number of items sold by a store), the time series data for each of these items or products may be similarly collected, which can be then used for forecasting future demand for a large number of items at an organization level.

In step S803, a domain-based segmentation may be performed to separate the collected large number of time series into statistically forecastable time series and non-statistically forecastable time series. As previously described, since an item or product with a scarce demand may be difficult to forecast by using machine learning techniques designed for statistically forecastable items that contain at least decent demand, the collected time series for the items with scarce demand may be better be sorted out first. To sort out the time series for the items with a scarce demand, a domain-based segmentation may be applied. Briefly, in the domain-based segmentation process, the collected large number of time series data may be plotted as time plots or scatterplots. The distribution of the time series for the items with scarce demand may show a difference when compared to other time series that exhibit at least decent demand, and thus can be categorized into the same domain using domain-based segmentation. Additionally or alternatively, when performing the domain-based segmentation, a certain threshold may be applied. The threshold may be predefined and used in the segmentation. For example, the threshold may be defined as a demand for an item or product within a certain time interval, such as a day, a week, a month, etc. The time series data for the items with a scarce demand may exhibit a demand amount less than the predefined threshold, and thus may be segmented into the same domain or segment, while time series data with demands equaling to or more than the predefined threshold may be segmented into another segment. In this way, the domain-based segmentation process may segment the collected large number of time series into the statistically forecastable time series and non-statistically forecastable time series.

In some embodiments, the domain-based segmentation process may be processed by different components included in the big data time series forecasting system 100. For example, if there is really a large number of time series (e.g., hundreds of thousands of time series) waiting for demand forecasting, a network device 103 may perform a domain-based segmentation locally and transmit only statistically forecastable time series to time series forecasting server 101 for machine learning-based time series forecasting. The non-statistically forecastable time series may be processed locally on a network device 103 by different forecasting models since these non-statistically forecastable time series are not going to be pooled together with other time series collected from other network devices 103 for clustering and cluster-based time series forecasting. This not only saves the bandwidth required for transmission of non-statistically forecastable time series, but also releases computation sources from time series forecasting server 101 to allow the server to focus more on the statistically forecastable time series in demand forecasting. Apparently, in some embodiments, the domain-based segmentation process may be also processed by time series forecasting server 101, e.g., when there are not a large number of time series for demand forecasting. In some embodiments, when there are an extremely large number of time series, other components, such as even cloud server unit 117, may be also employed in the domain-based segmentation and/or cluster level demand forecasting or another model-based demand forecasting.

In step S805, it is determined whether a time series is statistically forecastable or non-statistically forecastable, according to the result from the domain-based segmentation process from step S803. For a statistically forecastable time series, it will be pooled together with other statistically forecastable time series collected from the same or different network device for clustering, as will be described more in detail in steps S807-S813. For non-statistically forecastable time series, it will be processed differently in step S817, e.g., by using demand forecasting models that are designed for non-statistically forecastable time series, such as Simple Moving Average. In some embodiments, in step S817, some time series may be directly forecasted as zero demand if the currently available time series indicates that an item is barely in demand in a forecasting horizon (e.g., in the coming months or years).

In step S807, a large number of statistically forecastable time series may be grouped into different clusters, and an aggregate time series is then generated for all time series included in each cluster. The clustering may be a process that time series showing similarities in demand over time are clustered together against the time series that show different demand patterns. As previously described, when there are a large number of time series pooled together, there are certain time series that may show similar demand patterns, which can be then grouped together by using certain clustering techniques, e.g., based on k-means clustering or other different distance-based clustering techniques.

In some embodiments, an aggregate time series may be further generated for each cluster. For example, all time series in a cluster may be summed up at corresponding time points to generate an aggregate time series for the whole cluster. A demand forecast may be then performed for the aggregate time series at the cluster level. This then greatly saves the time required for demand forecast for the items included in the cluster.

In some embodiments, before grouping the statistically forecastable time series, certain time series may be preprocessed for variance correction and bias correction. In variance correction, a time series may be smoothed using moving average or other similar techniques, so as to ignore individual demand peaks while capturing common crests and troughs for the clustering purpose. In bias correction, the demand scales of the items or products may be normalized, e.g., by using the min-max scaling process or other similar techniques. This allows the items and products that have different demand scales to be grouped together if these items and products show similar demand patterns, other than the scale difference. The statistically forecastable time series after the variance correction and bias correction may be then grouped together as described above to form different clusters and generate an aggregate time series for each cluster.

In step S809, a cluster-level demand forecast may be performed by first using a nonlinear regression model on a generated aggregate time series to capture an overall trend of the aggregate time series. The nonlinear regression model may be obtained through a machine learning process, for example, the parameters included in the nonlinear regression model may be obtained through the machine learning process. In some embodiments, the time series data for an item may show certain fluctuations. That is, certain external variables may affect the demands in the short term. The nonlinear regression model discussed above, while capturing the overall trend really well, may not capture these fluctuations caused by the external variables.

In step S811, a linear regression model may be further applied to the aggregate time series to capture fluctuations caused by external variables. As previously described, the linear regression may include a plurality of predictor variables and corresponding coefficients, where each predictor variable may represent one type of event that causes fluctuations. For example, one predictor variable may be included in the linear regression model to capture repeatable events that may cause fluctuations in demand, and another predictor variable may be included in the linear regression model to capture one-off events that may also cause fluctuations in demand. In some embodiments, the linear regression model may be also trained through a machine learning process. In addition, in some embodiments, the nonlinear regression model and linear regression model may be integrated together to generate a single prediction model, which can be directly used to predict the future demand for a received time series (e.g., a received aggregate time series).

In step S813, a demand forecast for a specific item included in a cluster may be further determined based on the demand forecast for the aggregate time series of the cluster. In some embodiments, once the demand forecast is determined for the aggregate time series, the demand forecast for each time series included in the cluster may be determined based on the proportion of the historical contribution of each time series to the aggregate time series. That is, if the proportion of the historical contribution of a time series is 1%, the predicted demand for that item at a future time point is 1% of the demand forecast for the aggregate time series at that time point. In this way, each item included in the cluster may be predicted for future demand at any future time point. In some embodiments, if there are multiple clusters, each item included in other clusters may be also similarly determined. Accordingly, demand forecast for each statistically forecastable time series or item may be determined correspondingly.

In step S815, it may be further determined whether the accuracy or bias is optimal for a determined demand forecast for a time series. The accuracy or bias may be determined by comparing a predicted demand and an actual demand for an item or product. For example, if the predicted demand for the coming week/month is quite different from the actual demand after a week/month, the demand forecast for that item is not optimal. The process may then return to step S809, where the nonlinear regression model and/or the linear regression model may be optimized, e.g., by optimizing the parameters associated with each model and/or by selecting a different model that better fits an aggregate time series. This then improves accuracy in forecasting demands for each time series for future time points. In some embodiments, if only one or a few time series in a cluster do not show an optimal accuracy in demand forecast, these time series may be processed by using different models instead of forecasting at a cluster level. This can then ensure that each time series can be accurately forecasted for demand at a future time point.

The systems, methods, and products described herein are useful for big data analysis and/or processing. In one aspect, the disclosure provides tools for analyzing large sets of data, such as large sets of digital data, and converging them on a much lower amount of data within the data set. Aspects of the current disclosure provide technical solutions to the technical problem of how to efficiently sort, process, evaluate and make use of large quantities of digital or electronic data. As such, the problem addressed by this disclosure specifically arises in the realm of computers and networks and this disclosure provides solutions necessarily rooted in computer technology. For example, in some embodiments, the disclosure is directed to more than just retrieving and storing the data sets and include aspects that transform the data from one form into a new form through using various big data analysis techniques across multiple iterations that may include filtering, aggregation, prediction, determination and reconciliation processes.

While this disclosure may contain many specifics, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Under certain circumstances, multitasking and parallel processing may be utilized. Moreover, the separation of various system components in the implementations described above should not be understood as requiring such separation in all implementations, and it should be understood that the described program components and systems may generally be integrated together in a single software or hardware product or packaged into multiple software or hardware products.

Some systems may use certain open-source frameworks for storing and analyzing big data in a distributed computing environment. Some systems may use cloud computing, which may enable ubiquitous, convenient, on-demand network access to a shared pool of configurable computing resources (e.g., networks, servers, storage, applications, and services) that may be rapidly provisioned and released with minimal management effort or service provider interaction.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system for time series forecasting on a big data set, the system comprising:

a plurality of local network devices;

one or more servers coupled to the plurality of local network devices via a network; and a specifically configured data communication interface device coupled to the plurality of the local network devices and the one or more servers, the data communication interface device including a communication grid for handling and distributing large amounts of data into respective components for faster processing by the respective components, wherein each of the local network devices is configured to:

receive a plurality of time series, each of the time series representing a historical demand pattern for an item;

perform a local domain-based segmentation process that applies statistical variance analysis to automatically classify each time series as either statistically forecastable or non-statistically forecastable based on predetermined statistical thresholds, thereby creating a technical data partitioning that optimizes a distributed processing architecture; and transmit, over the network, statistically forecastable time series and non-statistically forecastable time series to the data communication interface device;

wherein the data communication interface device is configured to:

implement an intelligent data routing protocol that selectively distributes only the statistically forecastable time series to a remote server, while automatically dropping and blocking transmission of the non-statistically forecastable time series to prevent network congestion and optimize distributed computing resource allocation across the distributed processing architecture; and wherein the remote server is configured to:

receive the plurality of statistically forecastable time series from the data communication interface device;

execute a technical clustering algorithm that groups the plurality of statistically forecastable time series into one or more clusters based on statistical similarity metrics;

for each cluster, generate an aggregate time series based on time series included in the cluster;

perform a future demand forecast at a cluster level through a specialized dual-regression processing pipeline that:

performs a nonlinear regression on data of the aggregate time series to identify a nonlinear curve matching an overall demand trend associated with the aggregate time series;

performs a linear regression on the data of the aggregate time series to identify fluctuations along the nonlinear curve, wherein the identified fluctuations match demand fluctuations caused by one or more external variables;

generates a forecast model based on the nonlinear regression and the linear regression; and performs the future demand forecast at the cluster level by using the generated forecast model; and execute a proportional distribution algorithm that determines a future demand forecast for each item by calculating historical contribution ratios and applying cluster-level forecasts to individual items through the distributed processing architecture.

2. The system of claim 1, wherein the executable instructions further include instructions that, when executed by the processor, cause the processor to:

perform a future demand forecast for a non-statistically forecastable time series using a simple moving average prediction model.

3. The system of claim 1, wherein, prior to grouping the plurality of statistically forecastable time series into one or more clusters, the executable instructions further include instructions that, when executed by the processor, cause the processor to:

perform a variance correction to smooth the plurality of statistically forecastable time series; and perform a bias correction to normalize the plurality of statistically forecastable time series.

4. The system of claim 1, wherein the plurality of statistically forecastable time series are grouped into one or more clusters by using a distance-based method based on life-cycles of the plurality of statistically forecastable time series.

5. The system of claim 1, wherein each of the local network devices are further configured to: perform a future demand forecast for a non-statistically forecastable time series using a simple moving average prediction model.

6. The system of claim 1, wherein, prior to grouping the plurality of statistically forecastable time series into one or more clusters, each of the local network devices are further configured to:

perform a variance correction to smooth the plurality of statistically forecastable time series; and perform a bias correction to normalize the plurality of statistically forecastable time series.

7. The system of claim 6, wherein, to evaluate whether the determined future demand forecast for the item is within a predefined error range, each of the local network devices are further configured to:

track an actual demand for the item for a predefined time period after determining the future demand forecast for the item; and evaluate whether the determined future demand forecast for the item is within the predefined error range by comparing the actual demand for the item with a forecasted demand within the same predefined time period.

8. The system of claim 1, wherein, to determine a future demand forecast for each item, each of the local network devices are further configured to:

determine a proportion of a historical contribution of a time series associated with the item to the aggregate time series; and determine the future demand forecast for the item by distributing the cluster-level future demand forecast to the item according to the determined proportion of the item.

9. A method for time series forecasting on a big data set by a big data time series forecasting system comprising a plurality of local network devices, one or more servers coupled to the plurality of local network devices via a network, and a specifically configured data communication interface device coupled to the plurality of the local network devices and the one or more servers, the data communication interface device including a communication grid for handling and distributing large amounts of data into respective components for faster processing by the respective components, the method comprising:

receiving, by a local network device, a plurality of time series, each of the time series representing a historical demand pattern for an item;

performing, by the local network device, a domain-based segmentation process that applies statistical variance analysis to automatically classify each time series as either statistically forecastable or non-statistically forecastable based on predetermined statistical thresholds, thereby creating a technical data partitioning that optimizes a distributed processing architecture;

transmitting, by the local network device over the network, statistically forecastable time series and non-statistically forecastable time series to the data communication interface device;

implementing, by the data communication interface device, an intelligent data routing protocol that selectively distributes only the statistically forecastable time series to a remote server, while automatically dropping and blocking transmission of the non-statistically forecastable time series to prevent network congestion and optimize distributed computing resource allocation across the distributed processing architecture;

receiving, by the remote server, the plurality of statistically forecastable time series from the data communication interface device;

executing, by the remote server, a technical clustering algorithm that groups the plurality of statistically forecastable time series distributed by the data communication interface device into one or more clusters;

for each cluster, generating, by the remote server, an aggregate time series based on time series included in the cluster;

performing, by the remote server, a future demand forecast at a cluster level through a specialized dual-regression processing pipeline that:

performs a nonlinear regression on data of the aggregate time series to identify a nonlinear curve matching an overall demand trend associated with the aggregate time series;

performs a linear regression on the data of the aggregate time series to identify fluctuations along the nonlinear curve, wherein the identified fluctuations match demand fluctuations caused by one or more external variables;

generates a forecast model based on the nonlinear regression and the linear regression; and performs the future demand forecast at the cluster level by using the generated forecast model; and executing, by the remote server, a proportional distribution algorithm that determines a future demand forecast for each item by calculating historical contribution ratios and applying cluster-level forecasts to individual items through the distributed processing architecture.

10. The method of claim 9, further comprising:

performing a future demand forecast for a non-statistically forecastable time series using a simple moving average prediction model.

11. The method of claim 9, wherein, prior to grouping the plurality of statistically forecastable time series into one or more clusters, the method further comprises:

performing a variance correction to smooth the plurality of statistically forecastable time series; and performing a bias correction to normalize the plurality of statistically forecastable time series.

12. The method of claim 9, wherein the plurality of statistically forecastable time series are grouped into one or more clusters by using a distance-based method based on lifecycles of the plurality of statistically forecastable time series.

13. The method of claim 9, wherein the forecast model is trained through machine learning before being applied to perform the future demand forecast.

14. The method of claim 9, further comprising:

evaluating whether the determined future demand forecast for the item is within a predefined error range; and responsive to the determined future demand forecast for the item being out of the predefined error range, adjusting the forecast model used in the future demand forecast.

15. The method of claim 14, wherein evaluating whether the determined future demand forecast for the item is within a predefined error range comprises:

tracking an actual demand for the item for a predefined time period after determining the future demand forecast for the item; and evaluating whether the determined future demand forecast for the item is within the predefined error range by comparing the actual demand for the item with a forecasted demand within the same predefined time period.

16. The method of claim 9, wherein determining a future demand forecast for each item comprises:

determining a proportion of a historical contribution of a time series associated with the item to the aggregate time series; and determining the future demand forecast for the item by distributing the cluster-level future demand forecast to the item according to the determined proportion of the item.

17. A computer program product tangibly embodied in a non-transitory machine-readable storage medium, including instructions that when executed by a data processing apparatus comprising a local network device, a data communication interface device, and a remote server, cause the data processing apparatus to:

receive, via the local network device, a plurality of time series by a local network device, each of the time series representing a historical demand pattern for an item, wherein the local network device is one of a plurality of local network devices included in a big data time series forecasting system that further includes one or more servers coupled to the plurality of local network devices via a network;

perform, by the data processing apparatus through the local network device, a domain-based segmentation process that applies statistical variance analysis to automatically classify each time series as either statistically forecastable or non-statistically forecastable based on predetermined statistical thresholds, thereby creating a technical data partitioning that optimizes a distributed processing architecture;

transmit, via the local network device, statistically forecastable time series and non-statistically forecastable time series to, a specifically configured data communication interface device coupled to the plurality of the local network devices and the one or more servers, the data communication interface device including a communication grid for handling and distributing large amounts of data into respective components for faster processing by the respective components;

implement, by the data processing apparatus, an intelligent data routing protocol that selectively distributes only the statistically forecastable time series to the remote server, while automatically dropping and blocking transmission of the non-statistically forecastable time series to prevent network congestion and optimize distributed computing resource allocation across the distributed processing architecture;

receive, via the remote server, the plurality of statistically forecastable time series from the data communication interface device;

execute, by the data processing apparatus through the remote server, a technical clustering algorithm that groups the plurality of statistically forecastable time series distributed by the data communication interface device into one or more clusters based on statistical similarity metrics;

for each cluster, generate, by the data processing apparatus through the remote server, an aggregate time series based on time series included in the cluster;

perform, by the data processing apparatus through the remote server, a future demand forecast at a cluster level through a specialized dual-regression processing pipeline that:

performs a nonlinear regression on data of the aggregate time series to identify a nonlinear curve matching an overall demand trend associated with the aggregate time series;

performs a linear regression on the data of the aggregate time series to identify fluctuations along the nonlinear curve, wherein the identified fluctuations match demand fluctuations caused by one or more external variables;

generates a forecast model based on the nonlinear regression and the linear regression; and performs the future demand forecast at the cluster level by using the generated forecast model; and execute, by the data processing apparatus through the remote server, a proportional distribution algorithm that determines a future demand forecast for each item by calculating historical contribution ratios and applying cluster-level forecasts to individual items through the distributed processing architecture.

* * * * *